(No Model.) 3 Sheets—Sheet 1.

J. F. PACKER.
CULTIVATOR.

No. 529,136. Patented Nov. 13, 1894.

Witnesses:
Wm. F. Henning
Wm. M. Rheem

Inventor
John F. Packer
by Bond, Adams & Pickard,
his Attorneys

THE NORRIS PETERS CO., PHOTO-LITHO., WASHINGTON, D. C.

(No Model.) 3 Sheets—Sheet 3.

J. F. PACKER.
CULTIVATOR.

No. 529,136. Patented Nov. 13, 1894.

Witnesses:
Wm. F. Henning
Wm. M. Rheem

Inventor:
John F. Packer,
by Bond, Adams & Pickard,
his Attorneys.

THE NORRIS PETERS CO., PHOTO-LITHO., WASHINGTON, D. C.

UNITED STATES PATENT OFFICE.

JOHN F. PACKER, OF LA GRANGE, ILLINOIS.

CULTIVATOR.

SPECIFICATION forming part of Letters Patent No. 529,136, dated November 13, 1894.

Application filed January 18, 1892. Serial No. 418,529. (No model.)

*To all whom it may concern:*

Be it known that I, JOHN F. PACKER, a citizen of the United States, residing at La Grange, in the county of Cook and State of Illinois, have invented certain new and useful Improvements in Cultivators, of which the following is a specification, reference being had to the accompanying drawings, in which—

Figure 1:
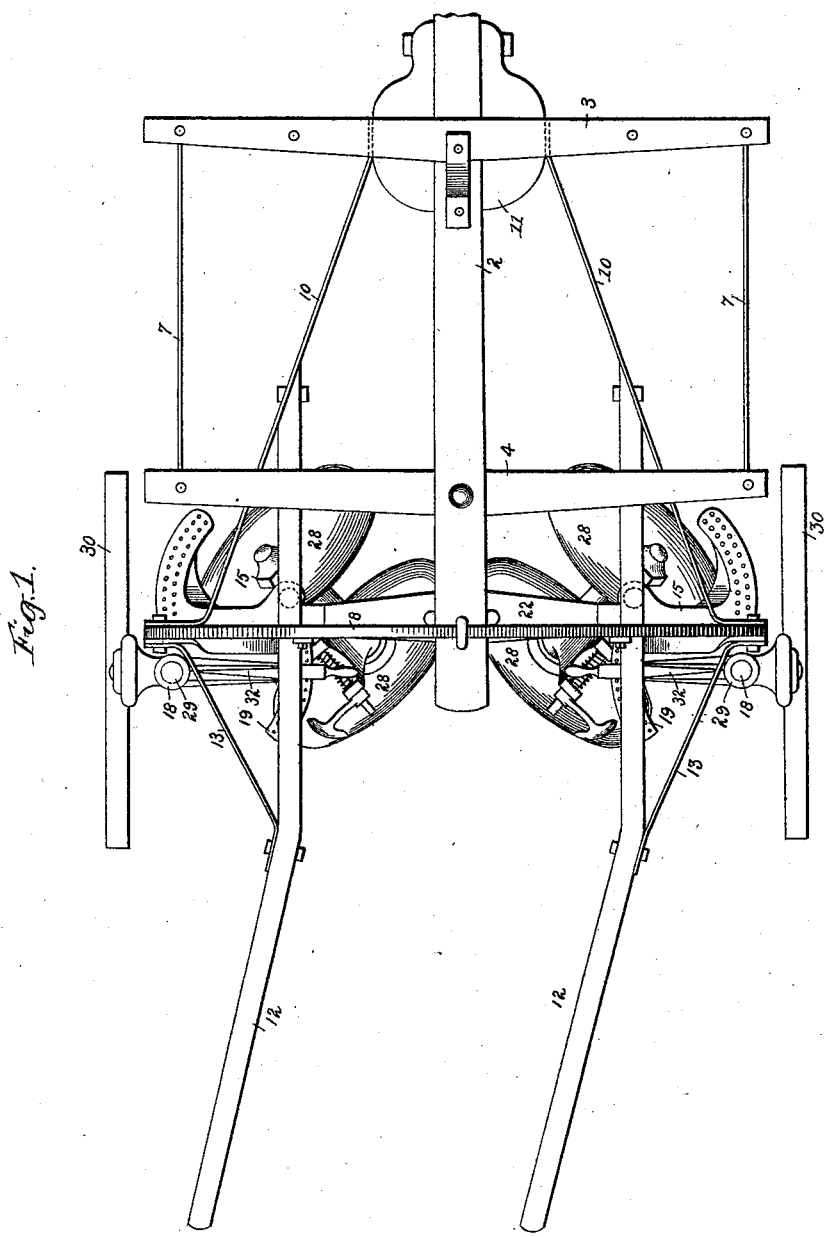
Figure 2:
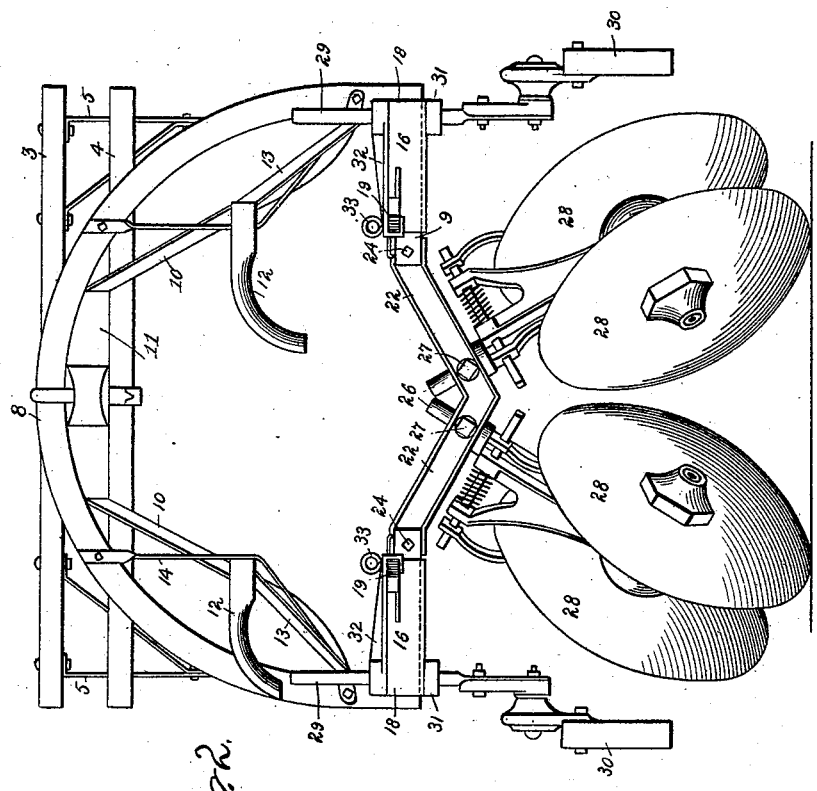
Figure 3:
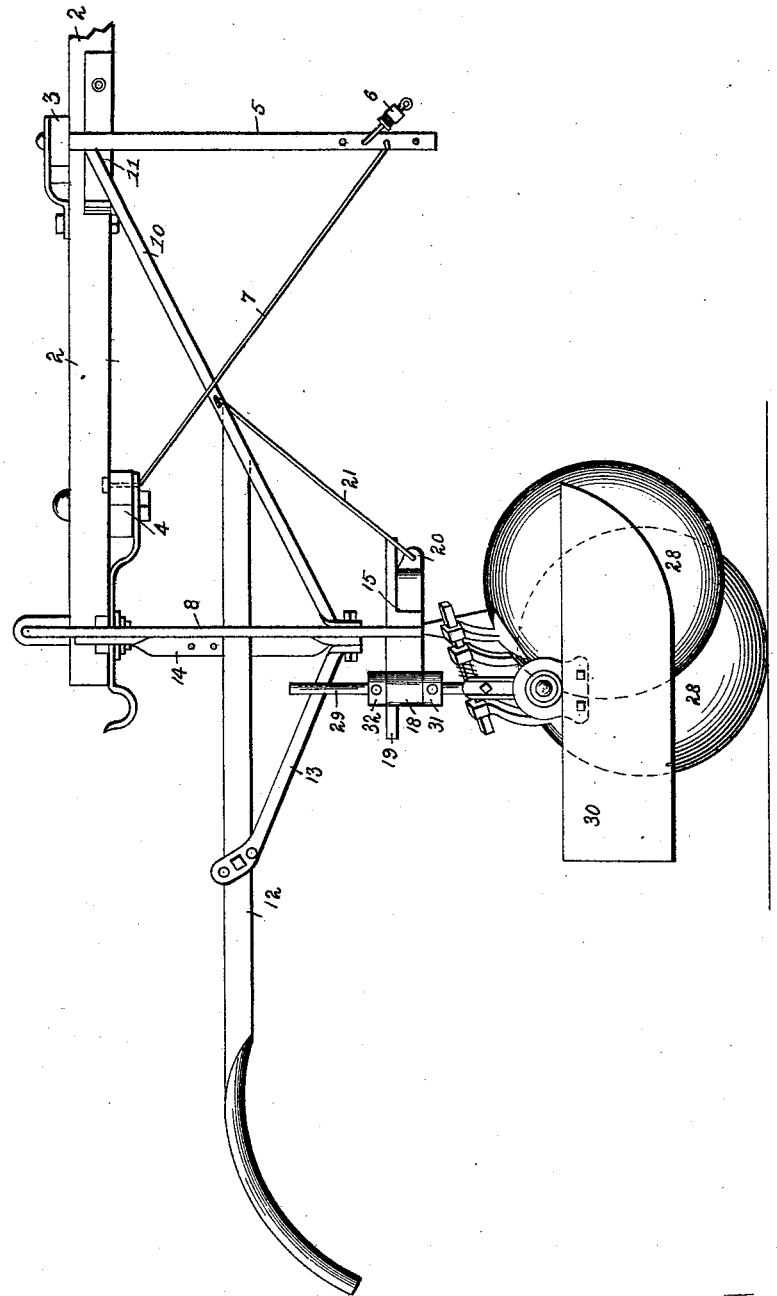

Figure 1 is a top or plan view. Fig. 2 is a rear elevation, and Fig. 3 is a side elevation.

My invention relates to cultivators, and is in most respects similar to that shown in my application for patent of even date herewith.

The object of my invention is to provide a new and improved cultivator which will be particularly adapted for use in cultivating listed corn when the crop is at an early stage, and to otherwise improve the construction of cultivators of this class. I accomplish these objects as hereinafter specified and as illustrated in the drawings.

That which I regard as new will be pointed out in the claims.

In the drawings, 1, indicates the frame of the cultivator, which is preferably similar in general construction to the frame of the cultivator shown in my application hereinbefore referred to, consisting of a tongue or pole 2, having double-trees 3 and 4 mounted thereupon. The double-tree 4 is placed a short distance in the rear of the double-tree 3, as best shown in Fig. 1, and is preferably on the under side of the pole.

5, indicates straps, one of which depends from each end of the double-tree 3, and is adapted to carry a single-tree 6, as best shown in Fig. 3.

7, indicates rods, one of which extends from each end of the double-tree 4 to the lower end of the strap 5 on the same side of the pole 2, as best shown in Fig. 1. By this construction the draft is equalized.

8, indicates the cultivator arch, which is secured to the pole 2 at its upper end, and extends downward, preferably in the form of a semicircle, as best shown in Fig. 4. The lower ends of the arch 8 are provided with inward projections 9, as best shown in Fig. 2.

10, indicates brace rods, which extend from a block 11, mounted in the front portion of the frame 1, backward and outward to the lower ends of the arch 8, to which they are rigidly connected by rivets or bolts.

12, indicates the handles of the cultivator, which at their forward ends are secured to the braces 10, and at their rear ends are bent outward at an angle, as shown in Fig. 1.

13, 14, indicate braces for securing the handles in position.

15, indicates brackets, one of which is mounted upon each inward projection 9 of the arch 8, as shown in Figs. 1 and 2. Each bracket consists of a sleeve 16, adapted to fit upon the projection 9.

18, indicates a boss projecting from the outer portion of the sleeve 16, at the rear, as best shown in Fig. 2.

19, indicates a segmental section, which projects to the rear from the inner end of the sleeve 16, and is formed in the arc of a circle of which the boss 18 is the center. The segment 19 is provided with a number of holes, as indicated in Fig. 1.

It will be seen from the foregoing description that the bracket 15 is substantially similar to the bracket described in my application for cultivator, of even date, except that it is not provided with two segments 19 and two bosses 18, as shown in such application. By providing the brackets with the two segments and two bosses, however, they may be used interchangeably on either machine, and in the drawings I have shown a double bracket as being used, although only the rear half of the bracket is in use on my present machine.

The brackets 15 are provided on their inner ends with ears 20, to which are connected brace rods 21, as best shown in Fig. 3. The upper ends of the brace rods 21 are secured to the braces 10, and the rods 21 serve to brace the brackets 15 and inward projections 9 against the resistance of the earth, in cultivating, and prevent their being bent out of line.

22, indicates a bar, which is adapted to be interposed between the inner ends of the extensions 9, and to be secured thereto, as best shown in Fig. 2. The ends of the bar 22 are provided with bolt-holes, through which bolts 24 may be passed for securing it in place, as shown in Fig. 2. The bar 22 is bent downward, preferably at an angle, as shown in Fig. 2; but if desired it may be curved. At opposite sides of the center of the bar 22 are placed bearings, which are adapted to receive the shanks 26 upon which the disks are mounted, as will be hereinafter described. The bearings extend about at right angles to the portion of the bar 22 in which they are placed, as best shown in Fig. 2, they being so arranged as to cause the shanks 26 to lie at an angle to each other, thereby throwing the disks outward.

27, indicates binding-screws, which pass through the sides of the bar 22 and are adapted to engage the shanks 26 to lock them in place. By this means, any desired vertical adjustment of the shanks 26 may be secured.

28, indicates disks, a pair of which are mounted upon each shank 26, substantially as described in my application of even date. I do not wish to limit myself, however, to disks mounted in any particular manner upon the shanks 26, as any suitable method of mounting the disks may be used.

29, indicates a shank, which is circular in cross section, and carries at its lower end a runner 30, which may be made of any suitable material. A shank 29 carrying the runner 30 is mounted in a bearing in each boss 18, and is vertically adjustable therein. The runners 30 may be mounted upon their respective shanks in any suitable manner.

31, indicates collars, one of which is mounted upon each shank 29, below the boss 18 in which it is mounted, and is adapted to be secured at any desired point upon said shank to prevent the weight of the arch and brackets from causing the brackets 15 to slide down to the lower end of the shank.

32, indicates levers, which fit upon the shanks 29 and are adapted to be secured thereto. The outer ends of the levers 32 are adapted to move over the segments 19, and pins 33 are provided, which pass through the handle and the holes in the segments, to secure the levers at any desired point.

Before cultivation, listed corn plants lie in the bottom of a trench formed by the planter, the dirt lying in ridges on each side of the corn rows. In cultivating such corn, especially for the first time, it is desirable that the earth on each side of the rows should be scraped away so as to thoroughly pulverize the dirt around the plants, and also to widen the furrow in which the corn is planted, so as to allow more sunshine to reach the plants. In cultivators adapted for use in this kind of cultivation, it has heretofore been found very difficult to direct the motion of the cultivator so that it would maintain its proper position with regard to the row. With the use of my improved cultivator, however, the runners 30 at each side of the cultivator arch travel on the ridges at each side of the corn row, and generally on the side of the ridges away from the row of plants being cultivated, serving to hold the cultivator steady. The work of guiding by the operator is thereby practically done away with.

The shanks 26 are set at such an angle that as the cultivator is drawn forward the disks 28 will cut away the earth from the sides of the ridges, and will carry it away from the row of plants.

When desired, the bar 22 may be removed, and by using brackets having two segments 19 and two bosses 18, the cultivator may be readily arranged for general use.

It will be seen that the principal feature of my present invention consists in arranging a runner at each side of the disks, adapted to run on the ridges at the sides of the plant-containing trench to hold the disks in place when in operation. These runners perform their function in a more satisfactory and efficient manner than do guide disks, for the reason that they have an extended bearing upon the ridges and are not liable to turn and thus allow the cultivator to be drawn out of the path designed to be traveled.

For cultivating listed corn, the cultivator disks are arranged in an inclined position, as illustrated, but for other classes of work, such for instance as surface cultivation, the disks will not be inclined, but will be arranged in a vertical position, or substantially so.

I have described the mounting of the disks and other features of construction of the frame of the cultivator, but I do not wish to limit myself to any particular construction of the parts referred to, as they are unessential, the essential feature being the use of guide runners at each side of cultivating disks, to hold the cultivating disks in place when in operation.

That which I claim as new, and desire to secure by Letters Patent, is—

1. In a listed corn-cultivator, the combination with an arch and cultivating disks of lateral runner guides arranged at the sides of the disks and adapted to run on the ridges at each side of the plant containing trench, to guide the cultivator, substantially as described.

2. In a listed corn-cultivator, the combination with an arch and inclined cultivating disks, of lateral runner guides arranged at the sides of the disks and connected with the arch, said runner guides adapted to run in the ridges at each side of the plant-containing trench to guide the cultivator, substantially as described.

3. In a disk cultivator, the combination with an arch, and cultivating-disks, of vertically adjustable lateral runner guides 30, arranged at the sides of the disks and adapted to run in the ridges at each side of the plant-containing trench, to guide the cultivator, substantially as described.

4. In a disk cultivator, the combination with an arch, and rotary concavo-convex disks, of vertically adjustable lateral runner guides arranged at the sides of the disks and adapted to run on the surface of the soil between the rows of the plants, to guide the cultivator, substantially as described.

JOHN F. PACKER.

Witnesses:
JOHN L. JACKSON,
CHARLES E. PICKARD.